No. 689,925. Patented Dec. 31, 1901.
W. H. SMALLEY.
MEASURING TAPE.
(Application filed Jan. 23, 1900.)
(No Model.)
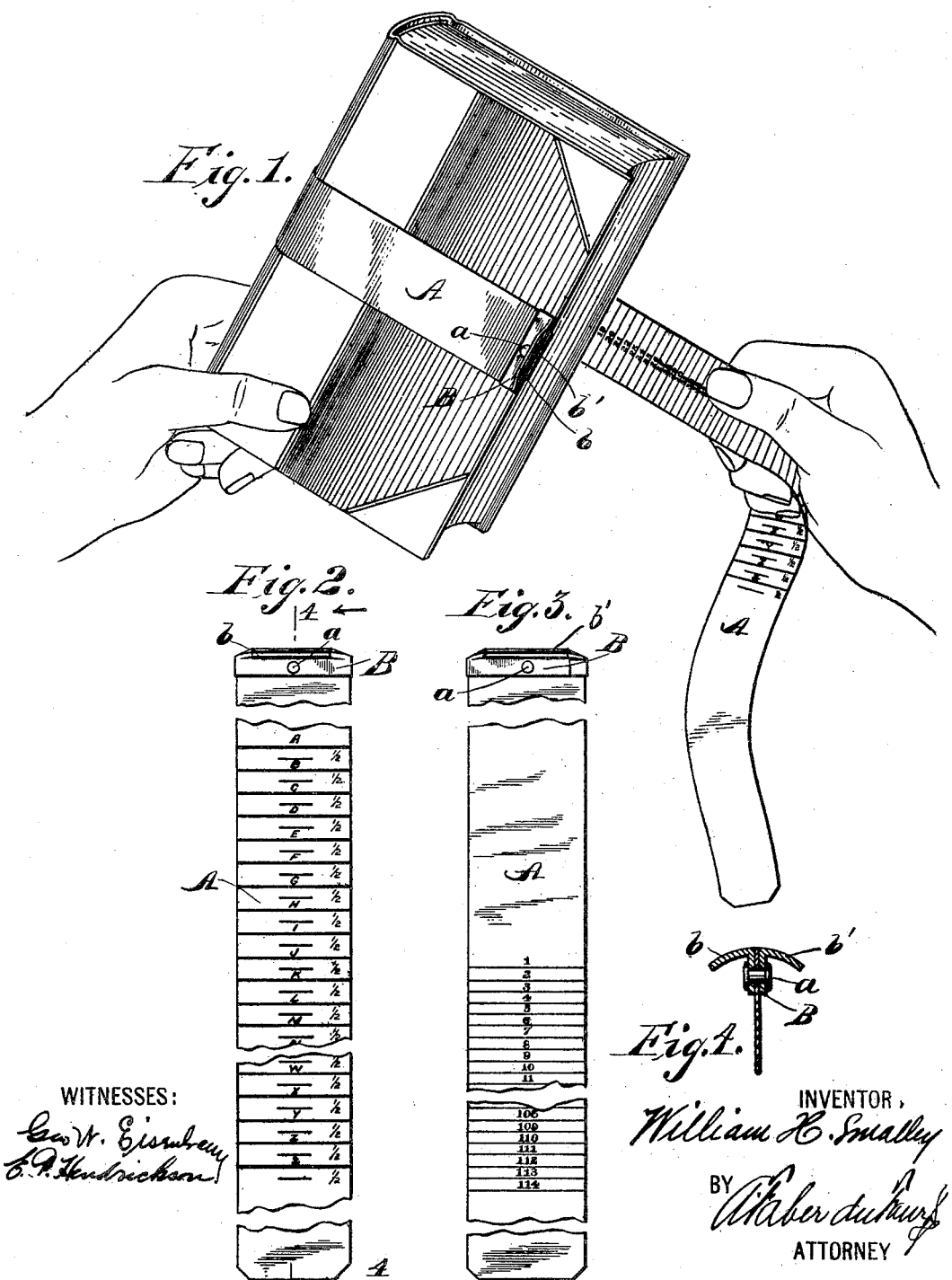
INVENTOR,
William H. Smalley
WITNESSES:
BY
ATTORNEY

UNITED STATES PATENT OFFICE.

WILLIAM H. SMALLEY, OF YONKERS, NEW YORK.

MEASURING-TAPE.

SPECIFICATION forming part of Letters Patent No. 689,925, dated December 31, 1901.

Application filed January 23, 1900. Serial No. 2,427. (No model.)

*To all whom it may concern:*

Be it known that I, WILLIAM H. SMALLEY, a citizen of the United States of America, residing at Yonkers, in the county of Westchester and State of New York, have invented certain new and useful Improvements in Measuring-Tapes, of which the following is a specification.

My invention has reference to measuring-tapes especially adapted for measuring books in order to determine the necessary size of book-cover to fit the individual book; and to that end it consists, essentially, of a flexible tape or ribbon having characteristics constituting scales on both sides and provided at one end with a hooking device having lateral flanges extending in opposite directions.

The nature of my invention will best be understood when described in connection with the accompanying drawings, in which—

Figure 1 represents a perspective view showing my improved measuring-tape being used to measure the size of a book. Fig. 2 is a face view of one side of the tape, the same being partly broken away. Fig. 3 is a view of the other side of the tape. Fig. 4 is a section on the line 4 4, Fig. 2, illustrating the construction of the double-flanged hook, said figure being drawn on an enlarged scale and part broken away.

Similar letters of reference designate corresponding parts throughout the several views of the drawings.

Referring to the drawings, the letter A designates a flexible tape or ribbon, to one end of which is attached, by means of a rivet or rivets $a$, a hooking device B, provided with two flanges $b\ b'$, extending from opposite sides of said hooking device and adapted to engage the edges of the book-cover. The flexible tape or ribbon A is provided on one side with graduations and characteristics indicating the size of the book laterally around both covers, as illustrated in Fig. 1. The characteristics for these graduations are preferably numerals, as indicated. On the reverse side of the tape are graduations marked by characteristics—such, for instance, as letters, Fig. 3—and this side of the tape is adapted to measure the height of the book by engaging the second flange of the hooking device B with the upper or lower end of the book and drawing the tape or ribbon A taut and then reading the graduation at the opposite end of the book. In the measuring-tape shown I employ the numerals in conjunction with the flange $b'$ to measure around the book and letters in conjunction with the flange $b$ for measuring the height of the book; but of course other characteristics distinguishing from each other could be used to the same end, or, if desired, the two sides of the tape or ribbon could be marked with a characteristic at some convenient part to distinguish the two sides and the graduations provided with similar characteristics. To avoid the possibility of error in ordering book-coverings for books, I prefer to use the system described in the present application, as the numerals will always show that the measurement is intended to be that around the book, while the letters will indicate the height of the book. The graduations for measuring the height of the book I prefer to make equal to two of the graduations adapted to measure around the book and then subdivide the graduations for measuring the height of the book and indicate such subdivisions by fractions "$\frac{1}{2}$." I also prefer to start the graduations for measuring around the book at the "$\frac{1}{2}$" mark between the "J" and "K" graduations on the reverse side of the tape or ribbon.

By the use of the double-flanged hooking device B, I am enabled to embody two scales upon one and the same tape or ribbon, so that one tape or ribbon will answer for measuring books in both directions and avoid any error in making coverings for books. The convenience of such a measuring-tape will be readily understood when it is desired to cover thousands of volumes and the coverings are manufactured at a distance from the parties giving the order.

It is of course to be understood that my improved measuring tape or ribbon may be used for measuring other objects than books. Therefore I do not wish to restrict myself to its use for such purpose.

What I claim as new is—

A measuring tape or ribbon for books provided with graduations on its opposite sides indicated by different characteristics, and said tape or ribbon being provided at one end with a hooking device adapted to engage with the edges of the book and comprising in its structure a portion attached to the tape or ribbon and having angular flanges extending in opposite directions; the characteristics and graduations on one side being adapted for the determination of one measurement, and those on the reverse side being adapted for the determination of another measurement in conjunction with the use of the corresponding flange of the hooking device, substantially as described.

In testimony whereof I have hereunto set my hand in the presence of two subscribing witnesses.

WILLIAM H. SMALLEY.

Witnesses:
EUGENIE P. HENDRICKSON,
GEO. W. EISENBRAUN.